AUTOMATIC RADIO RECEIVER SELECTOR

Filed Aug. 19, 1953 2 Sheets-Sheet 1

INVENTOR.
ROBERT P. DIMMER
BY [signature]
ATTY.

INVENTOR.
ROBERT P. DIMMER
BY Wm. Walter Owen
ATTY.

United States Patent Office 2,803,746
Patented Aug. 20, 1957

2,803,746

AUTOMATIC RADIO RECEIVER SELECTOR

Robert P. Dimmer, Lombard, Ill., assignor to General Telephone Laboratories, Incorporated, a corporation of Delaware Application August 19, 1953, Serial No. 375,240
4 Claims. (Cl. 250—20)

The present invention relates to radio communication systems, and more particularly to a frequency modulated mobile radio network including a plurality of mobile stations having access to a plurality of radio receivers which in turn are grouped about a base station, and means whereby the base station may automatically select from the plurality of receivers the one receiving the strongest signal from a mobile station, and means to connect this signal to a telephone central office.

In the mobile telephone systems throughout the country, it is the customary practice to employ more than one land based receiver per locality. This is necessitated by the fact that the power output of the mobile unit is small compared to the land transmitter, and consequently in order to make the effective service area of the mobile unit the same as the base radio station, a plurality of remote receivers are necessary. The audio outputs from these remote receivers are combined in the control terminal at the central office before entering the switchboard. These voltages combine in a single channel, and if any circuit constant in any one of the receivers is different from that of another, phase distortion will result and interfere with the communication established between the mobile station and the base station. Another undesirable feature of combining all receiver circuits into one channel is the fact that the land receiver farthest from the mobile unit will have the poorest signal to noise level, and the result will be that the mobile service operator will always have a very poor signal to noise level. In order to remedy this difficulty, I have designed an automatic radio receiver selector which will select the receiver with the best signal to noise ratio at all times. At the present time, most of the systems employ the services of an operator to make this selection.

It is the object of the present invention to provide a circuit arrangement which is common to all of the receivers operating on one assigned channel and to select the receiver possessing the best signal to noise ratio at all times.

Another object of the invention is to provide means for preventing the other standby receivers from coming in and interfering with the reception of a signal from the selected receiver unless a stronger signal is received by any one of said standby receivers.

Another object of the invention is to provide a circuit arrangement which will keep the selected receiver operated until a new selection has been established so as to eliminate periods of inoperativeness.

A further object is the utilization of the present connecting facilities existing between the base station and the terminal station containing the selector without the addition of further circuit components.

Figure 1:
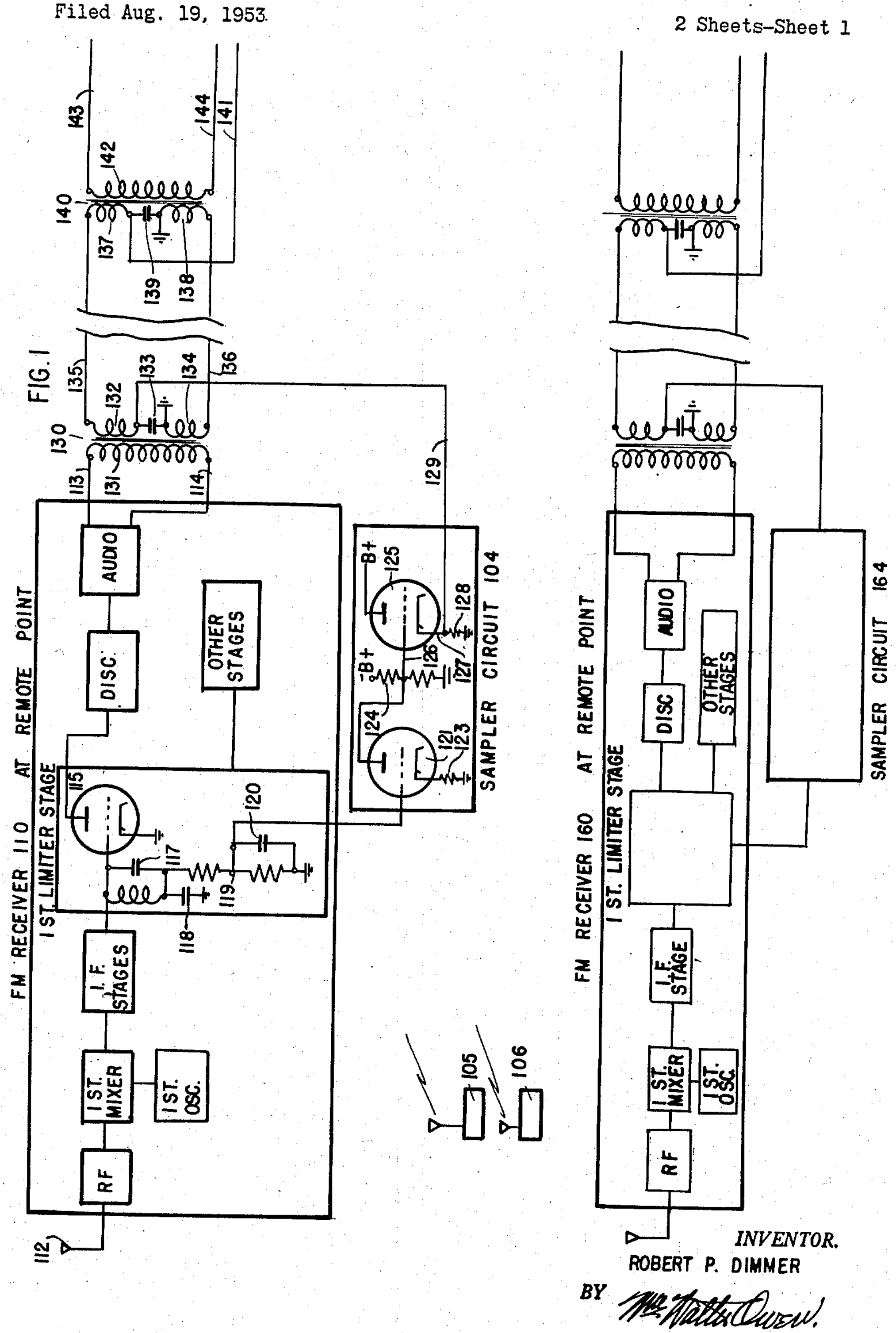

Fig. 1 shows two FM receivers 110 and 160 located within the area served by a base station and interconnected by their respective telephone lines to the receiver selector 200.

Figure 2:
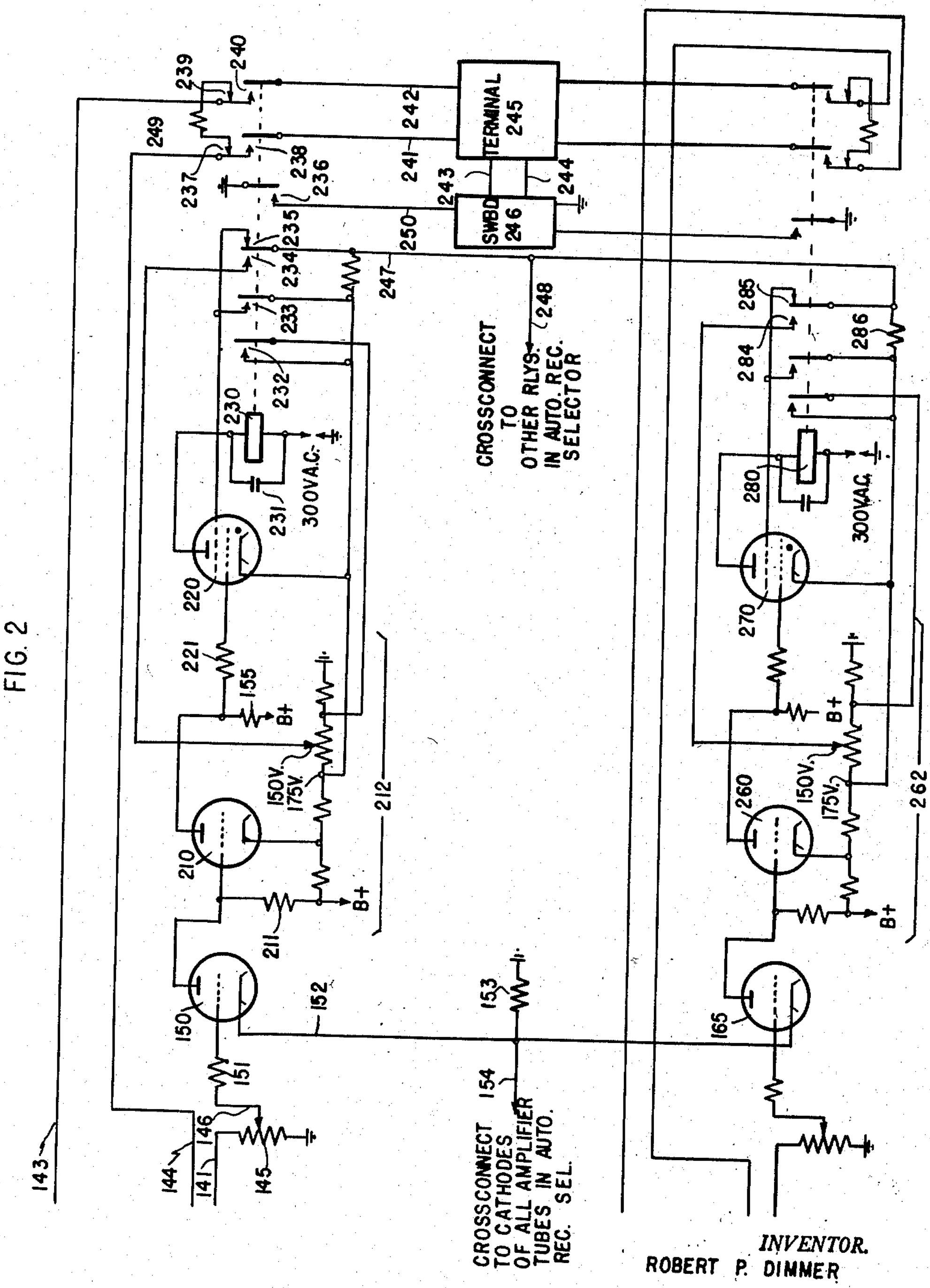

Fig. 2 illustrates schematically the selector 200 having the various stages for amplification of the selected signal and the relays which are used to connect the output of the receivers to the switchboard 246 via the terminal station 245.

The base station, also commonly called the land station, may possess a number of FM receivers in various positions around the base station to utilize the terrain features existing around said station to pick up radio signals transmitted by any one of the mobile units, such as 105 and 106, operating in the service area assigned to said base station. Fig. 1 illustrates two of such receivers, such as 110 and 160. Additional receivers that may be provided would be connected through the common lead 154 to the common cathode resistor 153.

The receiver selector 200 comprises a plurality of individual circuits, each individual circuit associated with one receiver. Each of said individual circuits utilizes an amplification stage, which may include more than one amplifier tube, and a trigger stage including a thyratron tube, such as 220, which is used to operate a relay, such as 230, to operate the various contacts associated therewith. The first stage of the individual circuit has an amplifier tube, such as 150, which is connected in common to the amplifier stages of the other individual circuits by means of a common cathode resistor 153.

A radio signal received by an FM receiver, such as 110, is amplified through the various receiver stages thereof and the output applied to the winding 131 of the repeating coil 130. A portion of the amplified signal is sampled at the first limiter stage of said receiver, such as across the resistor 119, thereafter inverted by tube 121, and then coupled by tube 125 through the telephone line 135 over a circuit including leads 129, 135 and 141 to be impressed upon the grid of the amplifier tube 150 which grid is adjustably connected to the resistor 145. The signal is then further inverted by tube 210, and impressed upon the control grid of the trigger tube 220, causing said tube to break down and conduct, resulting in the operation of relay 230, which in turn is effective to prevent the other trigger tubes found in the other individual circuits from operating and also to connect the audio output of receiver 110 from the repeating coil 140 to the terminal 245. The established connection is thereafter extended to the switchboard 246 where an operator situated thereat will establish a connection between the calling mobile unit and the desired subscriber accessible to the switchboard.

In a modern frequency modulated communication receiver, the first limiter grid current is a direct function of the signal input, that is, the stronger the signal, the larger the grid current. It is at this point, therefore, that it would be best to use as a representative voltage that which follows closely the signal to noise ratio. As the resulting voltage drop is positive with respect to ground, it becomes necessary to invert it to provide the proper polarity for the selector. This is shown in Fig. 1 which for simplicity shows only two receiver control channels comprising receivers 110 and 160. The description as to the method of operation will concern itself only with receiver channel containing the FM receiver 110.

A radio signal received over the antenna 112 is amplified and mixed with the output of the local oscillator shown in the block form within the receiver 110; and the output of said receiver is then impressed on lines 113 and 114 across the input winding 131 of the repeating coil 130. One of the FM receiver stages is shown in detail as indicated by the first limiter stage utilizing tube 115. The signal which is impressed on the grid of the tube 115 is also impressed across the tuned circuit comprising coil 116 and capacitor 117 and to ground through the capacitor 118, which serves to by-pass R. F. signals to ground.

When the signal is impressed on the grid of the tube 115, the voltage across the first limiter grid resistor 119 rises. A small portion of this voltage is introduced into the sampler circuit 104 to be impressed upon the control grid of the tube 121 which together with the other components function as an inverter stage. The grid of tube 121 is by-passed by capacitor 120 to remove any audio or R. F. components. When the voltage on the grid of tube 121 rises, it places a rising negative charge on said grid causing the plate current of this tube to reduce to zero thereby resulting in a corresponding voltage rise between the plate and the ground which rise is in the positive direction with respect to ground. As stated before, this stage functions as an inverter stage to change a rising negative voltage to a rising positive voltage.

The output of the tube 121 is connected to the grid of the tube 125 which with its associated components functions as a coupling stage. Tube 125 functions as a cathode follower to change the high positive voltage, existent at the plate of tube 121, to a lower positive voltage taken off at the cathode of tube 125 and connected by line 129 to the input of the repeating coil 130 and over line 135 to lead 141. This D. C. voltage does not in any way affect the transmission of the audio voltage impressed by the repeating coil 130 across the physical pair line comprising lines 135 and 136.

The break in the lines 135 and 136 indicates that the FM receiver 110 is placed at a remote distance from receiver selector circuit 200 and the components shown to the right of said break are located at the central office. The D. C. signal is taken off from the repeating coil 140 over the line 141 and passed to ground via resistor 145. A portion of this voltage is removed from the resistor 145 by means of the tap 146 and impressed upon the grid of the amplifier tube 150 via the resistor 151 which serves as an isolation resistor keeping the grid of said tube at a certain minimum voltage value. Tube 150 draws plate current in proportion to the value of the impressed grid voltage, and the bias voltage developed across resistor 153 is proportional to this plate current. As seen from Fig. 2, resistor 153 functions as a cathode resistor for a plurality of FM radio channels of which only two are shown, one channel including the FM receiver 110 and the other, the FM receiver 160. Lead 154 is indicated for connection to other FM receivers if necessary. Tube 150 functions as an amplifier to increase the magnitude of the signal impressed upon its grid.

Considering a voltage impressed on two or more receiver channels with their respective receivers 110 and 160, the channel with the greatest voltage input will develop the greatest bias voltage across the cathode resistor 153. This voltage, however, is common to the input amplifier tubes of the individual circuits by virtue of the common cathode bias resistor 153. Therefore, this bias voltage of a high value developed by the receiver channel containing receiver 110, for example, will tend to reduce the plate current of the amplifier tubes, such as tube 165 of the other receiver channels which have a lower grid voltage supplied by their respective receivers. If one of the other channels should suddenly receive a stronger signal, its input amplifier tube, such as 165, will raise the common bias across the common cathode resistor 153 and "set back" the plate current of the amplifier tubes of the other channels. By using such a system, only the channel with the greatest signal will activate the trigger tubes such as 220 or 270.

Continuing in the assumption that the FM receiver 110 has received the stronger radio signal, a related signal from the sampler circuit 104 will be received at the amplifier tube 150 to cause it to conduct and develop a voltage across its plate resistor 211 connected to the source of positive supply indicated by B+. This drop in positive voltage, which is negative with respect to ground, is impressed upon the grid of the next tube 210 which serves as an inverter. Tube 210 converts the negative signal of the previous stage into a positive signal with respect to ground, that is, the decrease of potential on grid 210 causes tube 210 to decrease its conduction, thereby resulting in a rising voltage on its plate. This rising voltage is impressed through the resistor 221 upon the grid of the trigger tube 220.

Trigger tube 220 is a gas tube possessing two grids: a control grid and a shield grid. Referring to Fig. 2, it is shown that tube 220 is energized by alternating current and not by direct current as would ordinarily be expected. Use of alternating current allows this tube to be extinguished without any difficulties as would be occasioned by the use of direct current. The trigger tube 220 is normally operated with a cathode bias high enough to allow a small negative charge to be placed on the control grid when in standby position to prevent said tube from firing prematurely.

As soon as a voltage rise occurs across the plate resistor 155 as a result of a signal from the receiver 110, tube 220 breaks down and conducts plate current over the following path: from the source of 300 v. A. C. through the winding on relay 230 and also through the capacitor 231, through the tube 220, and through the portion of the voltage network 212 to ground. Capacitor 231 serves to keep the relay 230 energized without chattering.

Relay 230 operates and closes its multitude of contacts. Contacts 232 close and drop the bias voltage present on the cathode of tube 220 from its value of 175 volts present on the voltage network 212 to a lower value, 150 volts, in conjunction with the closure of contacts 234. Contacts 234 also place a potential of 150 volts over the line 247, and contacts 285 to the shield grid of the trigger tube 270. Similarly the same potential is applied to the shield grids of all the trigger tubes that are connected to the line 248. Contacts 233 close and connect the shield grid directly to the cathode. The audio voltage output taken off from the repeating coil 140 over the lines 143 and 144 is connected to the lines 241 and 242 via the contacts 238 and 240, and is thereby connected to the terminal 245. Terminal 245 is connected by lines 243 and 244 to the switchboard 246 where an operator located thereat functions to establish a connection between the mobile subscriber, such as 105, calling over the selected FM receiver 110 to any called telephone subscriber accessible to the switchboard 246. Contacts 237 and 239 open and remove the load resistor 249 which functions to keep a certain load impedance connected across the output of the repeating coil 140 thereby preventing clicks whenever the output is connected to the terminal 245. Contacts 236 close a path from ground, through the contacts 236, and over the line 250 to the switchboard 246 where a signal alerts the operator that a call is coming in and also what receiver channel is operating. Referring to the lower receiver channel containing FM receiver 160, it can be seen that ordinarily the shield grid of tube 270 is connected through the contacts 285 and the resistor 286 to the cathode of the same tube whenever none of the radio channels in the system are operating. However, as in this case, the upper receiver channel is operating and therefore a potential of 150 volts is impressed on the shield grid of the tube 270 whereas the cathode of said tube is at a potential of 175 volts as indicated by the connection to the voltage network 262. This places a −25 volts bias on the shield grid preventing the tube 270 from triggering while the other channel is functioning.

Because A. C. voltage is used to energize the trigger tubes, such as 220, the associated relays, such as 230, will release when the receiver voltage drops below a predetermined value. As there will be a tendency for one relay to drop out before the next relay operates and establishes a new connection, contacts 232 lower the bias voltage on the trigger tube 220 so that a greater potential difference, than formerly, will exist between the cathode and the plate to hold the relay 230 operated until another relay, such as 280, establishes a new connection.

Should a stronger signal be received by the FM receiver 160, the operation of this channel will be similar to that described for the radio channel containing FM receiver 110. A stronger signal received by the FM receiver 160 will cause a larger bias voltage to be developed across the resistor 153 causing tube 165 to amplify this voltage variation. The development of a stronger bias drop across resistor 153 will affect the operation of all the other amplifier tubes, such as tube 150, causing said tube to decrease its conduction with the result that a weaker signal or no signal at all will thereafter be impressed on the grid of the trigger tube 220 causing it to become de-energized. De-energization of the trigger tube 220 will cause relay 230 to return to normal. But as explained before, tube 220 and its associated relay 230 will not become de-energized until trigger tube 270 together with its associated relay 280 begin to operate. After the lower receiver channel has taken over the function, the contacts associated with the relay 280 will function in the manner described for the operation involving relay 230.

Although the circuit was designed to select a receiver with the strongest signal coming from a number of remote radio receivers, it has other applications. It could be used to select the largest voltage, current, or power generated by a number of separate circuits or reactions. This type of circuit would constantly scan these points of variation and always function on the largest value or signal. For example, in a telephone system a traffic study could be made to show on which line the traffic of calls is the heaviest at a given instant. In production it would indicate which machine is producing more, which reaction is reacting faster or which operations are occurring more rapidly. In other words, the fastest or largest of a number of reactions could be indicated continuously.

While there has been described what is at present considered to be the preferred embodiment of the invention, it will be understood that various modifications may be made therein, and it is intended in the appended claims to cover all such modifications as fall within the true spirit and scope of the invention.

What is claimed is:

1. In apparatus for selecting the strongest of a plurality of radio signals received over a plurality of paths in varying degrees of strength, an amplifier tube for each path disposed to receive a portion or sample of the signal in that path, a resistor commonly coupled to the cathodes of said amplifier tubes, means including said resistor for reducing the effectiveness of all but the strongest of said sample signals, a gaseous discharge device associated with each path, each of said devices having an anode, cathode and control electrode, a source of alternating potential connected to the anodes of each of said devices, connections for applying the sample signal of each path to the control electrode of the gaseous discharge device in that path, the strongest of said sample signals causing breakdown or firing of its associated gaseous discharge device, a relay for each path, a terminal point common to all paths, one of said relays actuated by the said firing of the gaseous discharge device in its path to connect the path of the strongest signal to said terminal point.

2. In an apparatus for selecting the strongest of a plurality of radio signals received over a plurality of paths in varying degrees of strength as claimed in claim 1, holding means to keep said discharge device and thereby said relay, operated until a selection of another signal is made, said holding means also operated by the operation of said actuated relay.

3. In an apparatus for selecting the strongest of a plurality of radio signals received over a plurality of paths in varying degrees of strength as claimed in claim 2, wherein said holding means consists of a pair of contacts closed by the operation of said actuated relay, said contacts shorting a portion of the cathode resistor of said fired gaseous discharge device thereby enabling said discharge device to remain fired and, therefore, said relay to remain actuated until the selection of another signal is made.

4. In apparatus for selecting the strongest of a plurality of signals received over a plurality of paths in varying degrees of strength, an amplifier tube for each path disposed to receive a direct current signal which is proportional to the intensity of the signal in that path, a resistor commonly coupled to the cathode of said amplifier tubes, means including said resistor for reducing the effectiveness of all but the strongest of said direct current signals, a gaseous discharge device associated with each path, each of said devices having an anode, cathode, shield grid, and control grid, a source of alternating potential connected to the anodes of each of said devices, connections for applying the direct current signal of each path to the control grid of the gaseous discharge device in that path, the strongest of said direct current signals causing breakdown or firing of its associated gaseous discharge device in that path, a relay for each path, a terminal point common to all paths, one of said relays actuated by the said firing of the gaseous discharge device in its path, said actuated relay, through its contacts, connecting the path of the strongest signal to said terminal point, shorting a portion of the cathode resistor of said fired gaseous device to hold said device and thereby said relay, operated until the selection of another signal is made, and placing a negative bias with respect to the cathode on the shield grid of the other gaseous devices to prevent the firing of any of said other devices until another signal source with a stronger signal is selected.

References Cited in the file of this patent

UNITED STATES PATENTS

| | | |
|---|---|---|
| 1,747,218 | Bohn | Feb. 18, 1930 |
| 1,914,103 | Bjornson | June 13, 1933 |
| 1,922,059 | Ohl | Aug. 15, 1933 |
| 1,282,526 | Moore | May 12, 1942 |
| 2,503,957 | Lyons | Apr. 11, 1950 |
| 2,594,087 | Soffel | Apr. 22, 1952 |